United States Patent [19]

Ooi

[11] Patent Number: 5,566,184
[45] Date of Patent: Oct. 15, 1996

[54] PHASE AMBIGUITY REMOVING DEVICE

[75] Inventor: Tomoyuki Ooi, Tokyo, Japan

[73] Assignee: NEC Corporation, Tokyo, Japan

[21] Appl. No.: 215,480

[22] Filed: Mar. 21, 1994

[30] Foreign Application Priority Data

Mar. 19, 1993 [JP] Japan ................... 5-059996

[51] Int. Cl.[6] ............................ G06F 11/00
[52] U.S. Cl. .......................... 371/5.1; 371/5.4
[58] Field of Search ................. 371/5.1, 25.1,
371/47.1, 5.4, 42, 57.1, 57.2; 375/108,
10; 370/13, 14, 15, 16, 17

[56] References Cited

U.S. PATENT DOCUMENTS

| | | | |
|---|---|---|---|
| 3,736,507 | 5/1973 | Wolejsza, Jr. et al. | 325/30 |
| 4,022,973 | 5/1977 | Stackhouse et al. | 178/69.1 |
| 4,494,239 | 1/1985 | Martin | 375/39 |
| 4,849,997 | 7/1989 | Suzuki et al. | 371/118 |
| 5,025,455 | 6/1991 | Nguyen | 375/53 |

FOREIGN PATENT DOCUMENTS 59-134951   8/1984   Japan.

OTHER PUBLICATIONS

*Patent Abstracts of Japan*, vol. 12, No. 77, Mar. 10, 1988, p. 115, corresponding to JP-A-62 216 557.
*Patent Abstracts of Japan*, vol. 8, No. 264, Dec. 4, 1984, p. 52, corresponding to JP-A-59 134 951.

Primary Examiner—Robert W. Beausoliel, Jr.
Assistant Examiner—Phung My Chung
Attorney, Agent, or Firm—Sughrue, Mion, Zinn, Macpeak & Seas

[57] ABSTRACT

A phase ambiguity removing device for determining the proper phase of the Pch, Qch data demodulated by a receive side demodulator of a Quadrature Phase Shift Keying (QPSK) system includes a second phase information controller for determining the most probable phase of the received signals when detection of synchronizing words fail in the Pch and Qch signals.

6 Claims, 3 Drawing Sheets

5,566,184

PHASE AMBIGUITY REMOVING DEVICE

BACKGROUND OF THE INVENTION

1. Field of the Invention

The present invention relates to a phase ambiguity elimination device and, more particularly, to a phase ambiguity elimination device which uses a detected synchronizing word in eliminating phase ambiguity from a QPSK signal. The synchronizing word may be a unique word (UW) of frame synchronizing system used in a modulation/demodulation apparatus of a satellite communication, quadrature phase shift keying (QPSK) system.

2. Description of the Related Art

In a frame synchronizing system of a QPSK modulation system, each of the Pch and Qch data signals is provided with a UW. The UW is detected and used for phase synchronizing purposes at a receiving side. However, there are four phase states (P, Q), (Q, $\bar{P}$), ($\bar{P}$, $\bar{Q}$) and ($\bar{Q}$, P) due to phase slip, as described in, for example, Japanese Patent Laid-open Publication No. 134951/1984 (JP-A-59-134951). $\bar{P}$ and $\bar{Q}$ stand for inversions of P and Q channel signals, respectively. Therefore, when such data is demodulated in the receiving side, there is a phase ambiguity. In order to remove the ambiguity, it is necessary to determine the phase of the received signals, and correct the phase, when necessary, to a determined, correct phase. This may be achieved by using a phase ambiguity elimination or removing device, as it may also be called. The phase ambiguity removing device compares a demodulated UW with a reference UW stored in the receiving side, calculates an error value and decides the correct phase according to the error value.

As described above, since the position of the UW in a frame is predetermined in accordance with system criteria, subsequent UWs can be detected at fixed intervals once a first UW is detected.

However, if there is a failure to detect the UW then a change in phase is not detected and the last detected phase information is used continuously, since there is no new phase information. As a result, if the phase of the received data changes due to phase slip, the phase ambiguity removing device can not properly correct the phase for it operates on received data with erroneous phase information. Consequently, the received data becomes different from the transmitted data, resulting in an error.

SUMMARY OF THE INVENTION

It is therefore an object of the present invention to provide a phase ambiguity removing device capable of obtaining the most probable phase.

It is another object of the present invention to provide a phase ambiguity removing device capable of removing phase ambiguity, even when a synchronizing word is not detected.

According to the present invention, a phase ambiguity removing device includes a counter for counting the number of error bits in received synchronizing words of two predetermined phases, a first phase information controller for generating a first phase information indicative of the phases in which received synchronizing words are detected on the basis of the number of error bits, a second phase information controller for generating a second phase information indicative of the phases in which the probability of the existence of a synchronizing word is high, a selector for switching between the first and second phase information, and a removing circuit for removing phase ambiguity from received signals on the basis of an output of the selector and for supplying a signal having the proper phase.

BRIEF DESCRIPTION OF THE DRAWINGS

The above and other objects, features and advantages of this invention will become more apparent from the following detailed description taken with the accompanying drawings in which.

In the drawings, the same reference numerals denote the same structural elements.

DESCRIPTION OF THE PREFERRED EMBODIMENT

First, to facilitate an understanding of the present invention, a conventional phase ambiguity removing device will be described with reference to FIG. 1.

Figure 1:
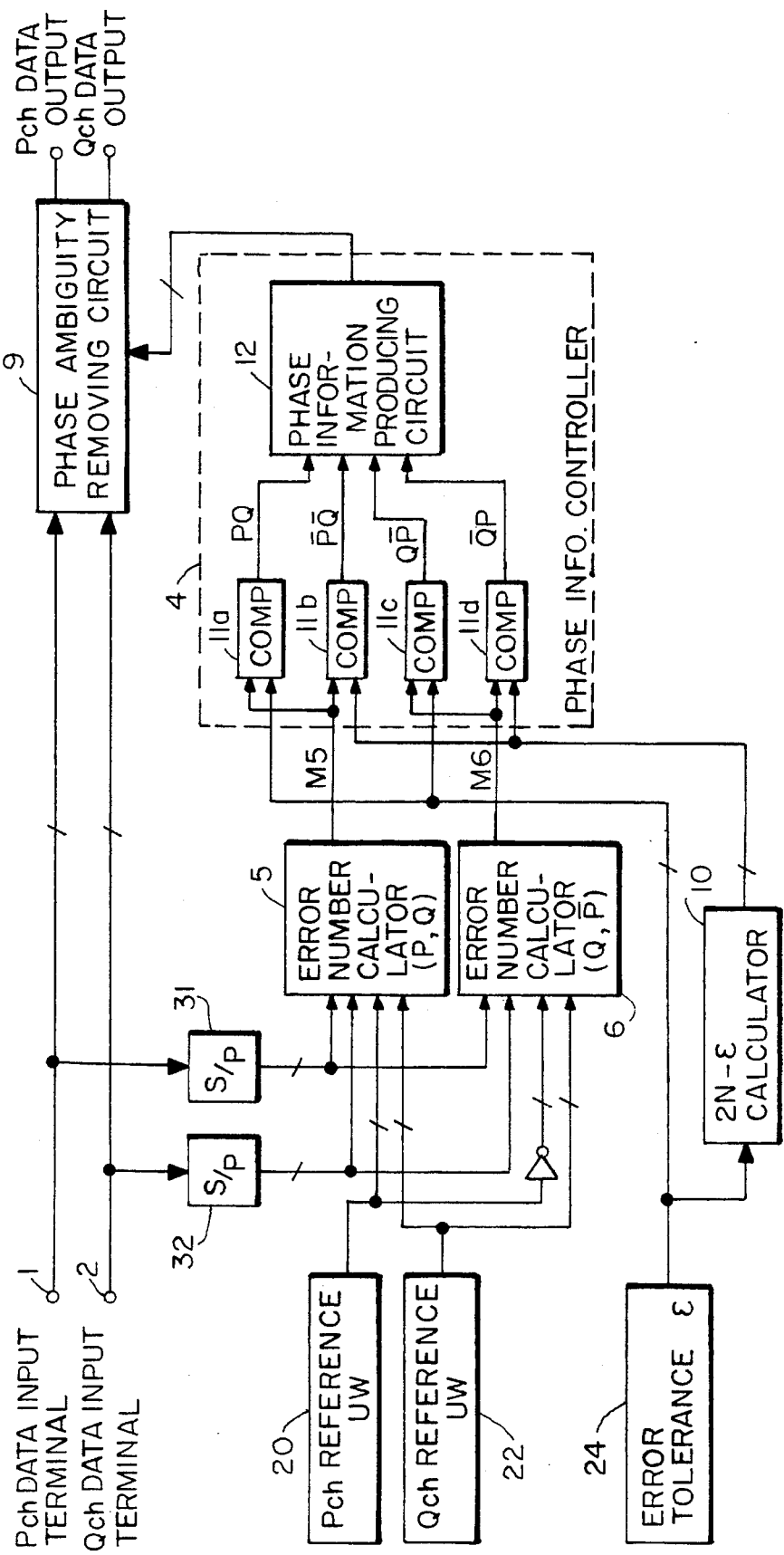
FIG. 1 is a block diagram schematically showing a conventional phase ambiguity removing device.

In FIG. 1, the conventional phase ambiguity removing device comprises a Pch demodulated data input terminal 1, a Qch demodulated data input terminal 2, serial/parallel converters 31 and 32, a phase information controller 4, UW error number calculators 5 and 6, a phase ambiguity removing circuit 9, and a (2N–ε) calculator 10.

The phase information controller 4 comprises comparators 11a, 11b, 11c, and 11d, and a phase information producing circuit 12. A UW is (N) bits for each of the Pch and Qch data and is unique for the system employed.

Pch and Qch data demodulated by a demodulator (not shown) respectively are input from Pch data input terminal 1 and Qch data input terminal 2 and converted into parallel data for each of (N) bits by the serial/parallel converters 31 and 32. The UW error calculator 5 compares the each of Pch and Qch parallel data with each of Pch and Qch reference UWs produced respectively by the reference unique word generators 20, 22, and calculates the number of bits among (2N) bits of both the Pch and Qch which do not coincide with the bits of the reference UWs. The UW error number calculator 6 compares the Pch parallel data with the Qch reference UW and the Qch parallel data with the inversion of the Pch reference UW, and calculates the number of bits among (2N) bits of both the Pch and Qch which do not coincide with the bits of the reference UW with which they were compared.

The outputs M5 and M6 of the UW errors calculators 5 and 6 are compared, by the comparators 11a to 11d with a predetermined allowable number of errors E provided by error tolerance circuit 24 or (2N–ε) calculated by the (2N–ε) calculator 10. The comparator 11a compares M5 with ε, the comparator 11b compares M5 with (2N–ε), the comparator 11c compares M6 with ε, and the comparator 11d compares M6 with (2N–ε). The comparators output "1" when any of the following conditions is satisfied:

$$(M5) \leq \epsilon \qquad (1)$$

$$(M5) \geq (2N-\epsilon) \qquad (2)$$

$$(M6) \leq \epsilon \qquad (3)$$

$$(M6) \geq (2N-\epsilon) \qquad (4)$$

Assuming the following situation:

$(M5)=60$ $(M6)=30$ $(N)=32$ $(\epsilon)=6$

Equation (2) is satisfied as follows;

$(M5)=60 \geq (2N-\epsilon)=64-6=58$

Therefore, the comparator 11*b* outputs "1". Since the other comparators 11*a*, 11*c*, and 11*d* do not satisfy any of equations (1) (3) or (4), they output "0". That is, it is decided that a UW could be detected in the phase $(\overline{P}, \overline{Q})$. The phase information producing circuit 12 delivers phase information indicative of the phase in which the UW is detected to the phase ambiguity removing circuit 9. The phase ambiguity removing circuit 9 removes the ambiguity by switching the received data as explained below on the basis of the phase information.

In this conventional device, however, if the UW is not detected and the phase is changed by phase slip as described before, data which is different from the transmitted data is generated since the device seeks to remove phase ambiguity of received data on the basis of erroneous phase information.

Therefore, the present invention provides a phase ambiguity removing device capable of obtaining the most probable phase.

Now there will be described in detail a preferred embodiment of the present invention with reference to FIGS. 2 to 3.

Figure 2:
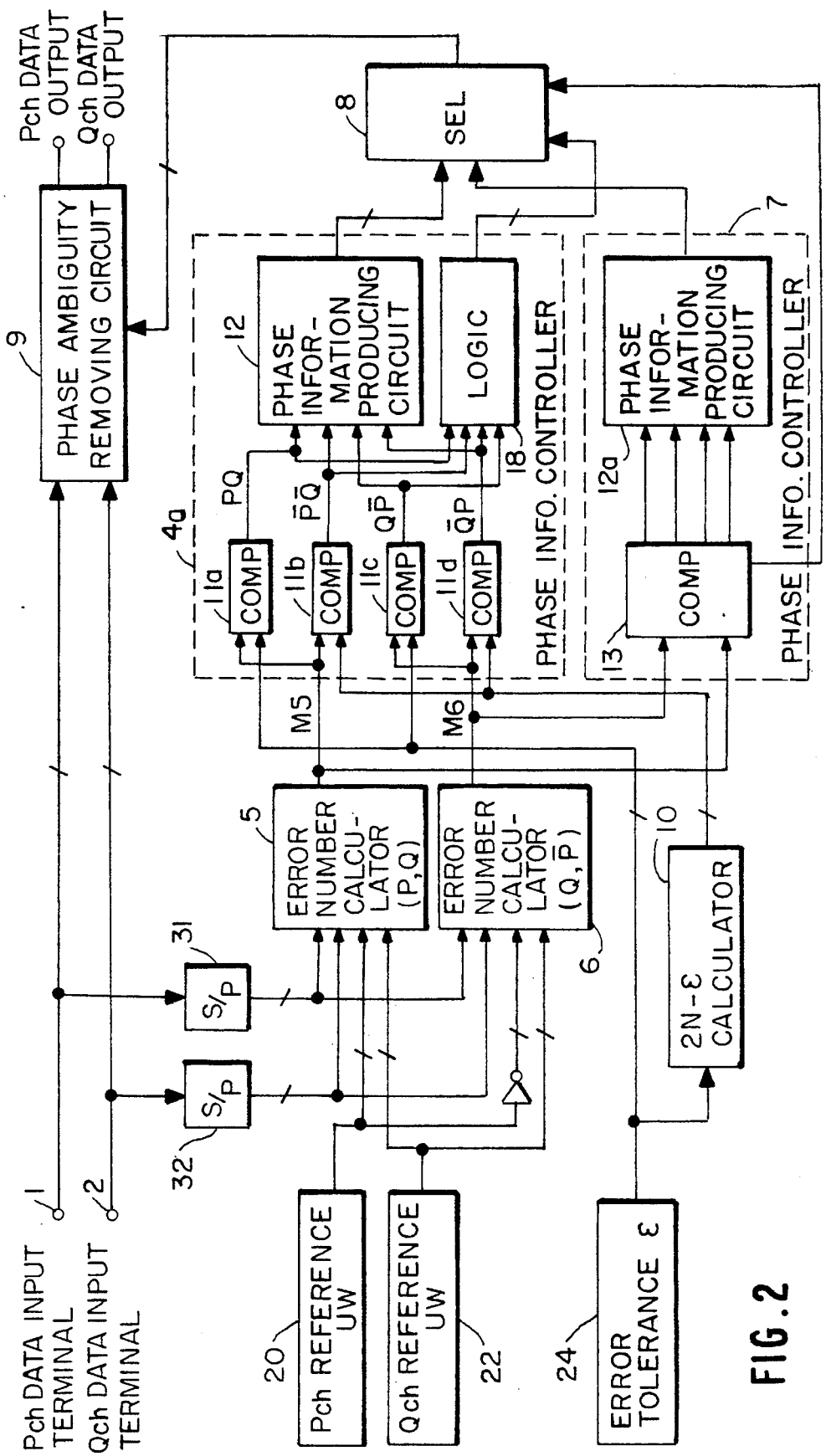
FIG. 2 is a block diagram of a preferred embodiment of the phase ambiguity removing device of the present invention.

In FIG. 2, a phase ambiguity removing device according to a preferred embodiment of the present invention consists of a Pch demodulated data input terminal 1, a Qch demodulated data input terminal 2, serial/parallel converters 31 and 32, phase information controllers 4*a* and 7, UW error numbers calculators 5 and 6, a selector 8, a phase ambiguity removing circuit 9, and a $(2N-\epsilon)$ calculator 10. The phase information controller 4*a* comprises comparators 11*a*, 11*b*, 11*c*, and 11*d*, a phase information producing circuit 12 and a logic circuit 18. The phase information controller 7 comprises a phase information producing circuit 12*a* and a comparator 13. Portions except for a part of the phase information controller 4*a*, the phase information controller 7 and the selector 8 operate in respectively the same manners as the corresponding portions of the conventional configuration illustrated in FIG. 1.

The logic circuit 18 in the phase information controller 4*a* decides whether the UW is detected or not. The logic circuit 18 controls the selector 8 so as to select phase information from the phase information controller 4*a* when UW is detected, e.g., when one of the outputs from the comparators 11*a* to 11*d* is "1" and to select phase information from the phase information controller 7 when a UW is not detected, e.g., when all of the outputs from the comparators 11*a* to 11*d* are "0".

The comparator 13 in the phase information controller 7 compares the number of UW errors in respective phases to determine a phase whose number of UW errors is minimum. The phase information producing circuit 12*a* determines the phase whose number of UW errors is minimum as the most probable phase and outputs this phase information. The selector 8 selects the phase information of the phase information producing portion 4*a* when a UW is detected and selects the phase information of the phase information producing portion 7 when a UW is not detected, and sends the selected phase information to the phase ambiguity removing portion 9.

Figure 3:
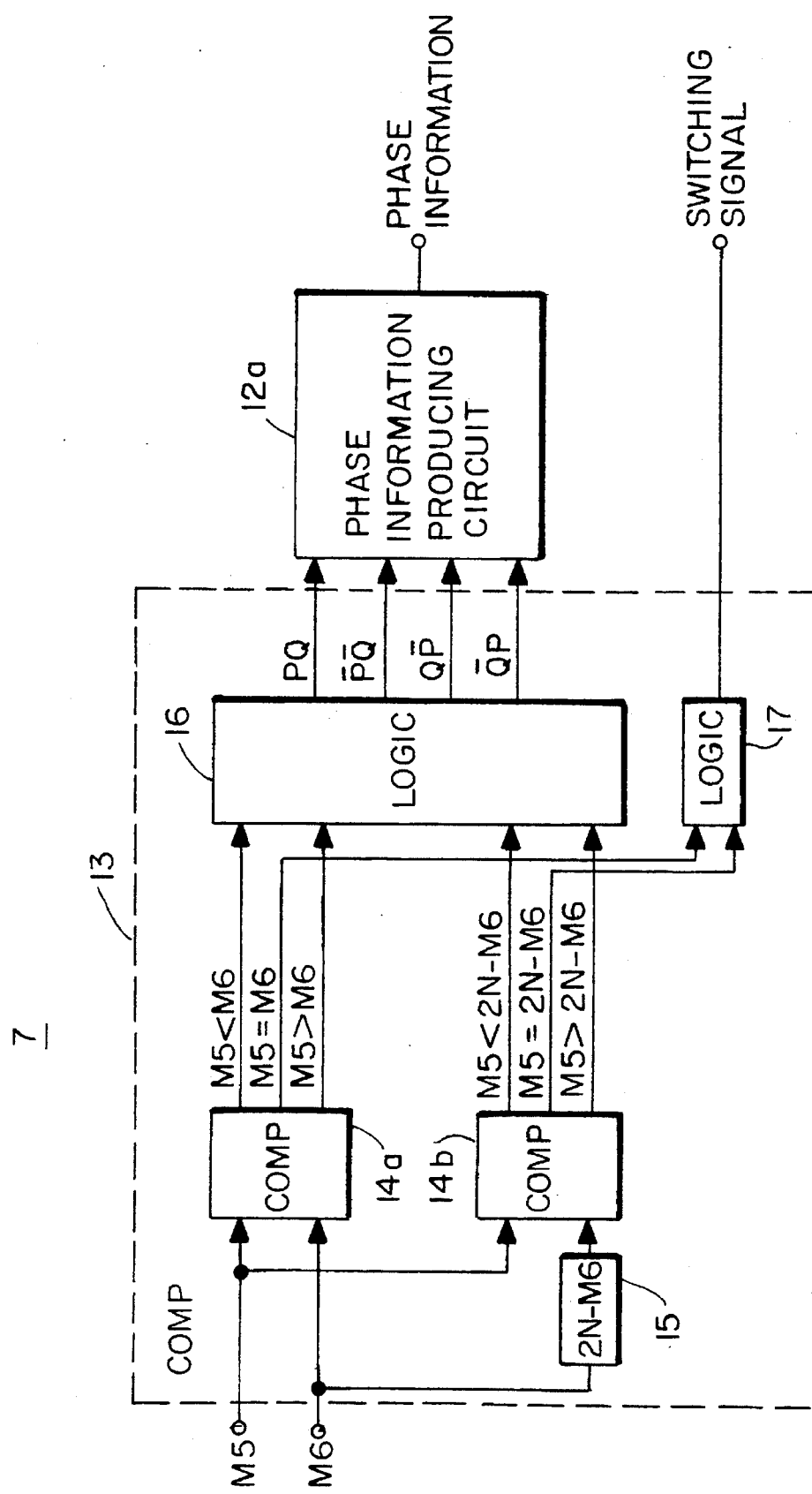
FIG. 3 is a block diagram of a preferred embodiment of the phase information controller shown in FIG. 2.

FIG. 3 is a detailed block diagram of a preferred embodiment of the phase information controller 7 shown in FIG. 2. In FIG. 3, the phase information controller 7 consists of the comparator 13 having comparators 14*a* and 14*b*, a calculator 15, and logic circuits 16 and 17, and the phase information producing circuit 12*a*.

A technique for determining a phase having the least number of errors will be described. The comparator 14*a* compares the number M5 of UW errors in the (P,Q) phase with the number M6 of UW errors in $(Q,\overline{P})$ phase and outputs "1" from an output "M5<M6" when M5<M6 is satisfied, from an output "M5=M6" when M5=M6 is satisfied, from an output "M5>M6" when M5>M6 is satisfied. The comparator 14*b* compares M5 with (2N−M6) from the calculator 15 calculating (2N−M6). Since (2N−M6) indicates an inversion of $(Q,\overline{P})$ phase, that is, the number of UW errors of $(\overline{Q},P)$ phase, the comparator 14*b* compares the number of UW errors of (P,Q) phase with the number of UW errors of $(Q,\overline{P})$ phase and outputs "1" from an output "M5<2N−M6" when M5<2N−M6 is satisfied, from an output "M5=2N−M6" when M5=2N−M6 is satisfied, from an output "M5>2N−M6" when M5>2N−M6 is satisfied.

Since (M6)+(2N−M6)=(2N), when (M5)<(M6) and (M5)<(2N−M6), it is clear that either (M6) or (2N−M6) is not more than (N). Therefore, (M5)≦(N) is established. Furthermore, considering (2N−M5), that is, the number of UW errors of $(\overline{P},\overline{Q})$ phase which is an inversion of (P,Q) phase, (2N−M5)≧(N) is established and thus (M5)≦(2N−M5). Therefore, when (M5)<(M6) and (M5)<(2N−M6) are satisfied, the (P,Q) phase can be considered as the most probable phase because (M5) is the least value.

Assuming (M5)<(2N−M5) when (M5)>(M6) and (M5)<(2N−M6), this establishes that (M6)<(M5)<(2N−M5)<(2N−M6). Therefore, (M6) is the least value and (Q, $\overline{P}$) phase can be considered as the most probable phase. On the other hand, in a case of (2N−M5)<(M5), (2N−M5)−(M6)=(2N−M6)−(M5)>0 and hence (M6)<(2N−M5)<(M5)<(2N−M6). Therefore, in this case, the $(Q,\overline{P})$ phase is also considered as the most probable phase.

Assuming (M6)>(2N−M6) when (M5)>(M6) and (M5)>(2N−M6), it becomes (2N−M6)−(2N−M5)=(M5)−(M6)>0 and hence (2N−M5)<(2N−M6)<(M6)<(M5). Thus, (2N−M5) becomes the least value. On the other hand, when (M6)<(2N−M6), it becomes (M6)−(2N−M5)=(M5)−(2N−M6)>0 and also (2N−M5)<(2N−M6)<(M6)<(M5). Therefore, when (M5)>(M6) and (M5)>(2N−M6), $(\overline{P},\overline{Q})$ phase is considered as the most probable phase.

Assuming (M5)>(2N−M5) when (M5)<(M6) and (M5)<(2N−M6), it becomes (2N−M5)−(2N−M6)=(M6)−(M5)>0 and hence (2N−M6)<(2N−M5)<(M5)<(M6). Thus, (2N−M6) is the least value. On the other hand, when (M5)<(2N−M5), it becomes (2N−M6)<(M5)<(2N−M5)<(M6). Therefore, (2N−M6) becomes the least value and $(\overline{Q},P)$ phase is considered as the most probable phase.

The logic circuit 16 determines (P,Q) phase when (M5)<(M6) and (M5)<(2N−M6), $(Q,\overline{P})$ phase when (M5)>(M6) and (M5)<(2N−M6), $(\overline{P},\overline{Q})$ phase when (M5)>(M6) and (M5)>(2N−M6), and $(\overline{Q},P)$ phase when (M5)<(M6) and (M5)>(2N−M6), and outputs "1" at the respective outputs "PQ", "$\overline{Q}P$", "$\overline{PQ}$" and "$\overline{Q}P$", as mentioned previously. The phase information producing circuit 12*a* produces a phase information signal according to the output of the logic circuit 16 and supplies it to the selector 8.

Further, since the determination of phase becomes uncertain when the number of UW errors results in (M5)=(M6) or (M5)=(2N−M6), the output of the phase information controller 4a is used as the phase information. In this case, the logic circuit 17 outputs a switch signal to the selector 8. The selector 8 selects the phase information from the phase information controller 4a when a UW is detected and the phase information from the phase information controller 7 when a UW can not be detected and supplies the phase information selected to the phase ambiguity removing circuit 9, as mentioned previously. However, when the number of UW errors of (P,Q) phase and (Q,$\bar{P}$) phase or (P,Q) phase and ($\bar{Q}$,P) phase become equal, even if a UW can not be detected, the phase information from the phase information controller 4a is selected.

As hitherto described, the present invention can remove phase ambiguity based on the most probable phase, when phase slip occurs and UW detection fails, by using a selector to switch the phase information to one corresponding to the most probable phase. This is unlike the conventional system in which phase ambiguity is removed on the basis of the phase information of the preceding frame only, and, therefore, the present invention can remove phase ambiguity more reliably. Consequently, errors in received data are reduced as compared with the conventional system.

What is claimed is:

1. A phase ambiguity removing device comprising:

counting means for counting a number of error bits of received synchronizing words of two predetermined phases among four phases due to phase slip of a received QPSK signal;

first phase information controlling means for generating a first phase information indicative of the phases for which the received synchronizing words are detected on the basis of said number of error bits detected by said counting means;

second phase information controlling means for generating a second phase information indicative of the phases for which a probability of existence of said synchronizing word is high when the received synchronizing words cannot be detected on the basis of said number of error bits detected by said counting means;

selecting means for selecting a phase information from said first phase information controller when the received synchronizing words are detected or from said second phase information controller when the received synchronizing words cannot be detected; and removing means for removing phase ambiguity from received signals on the basis of an output of said selecting means.

2. The removing device as claimed in claim 1, wherein said second phase information controlling means further comprises:

means for determining the phase whose error number is minimum as the most probable phase on the basis of comparing said synchronizing word errors in said respective phases.

3. The removing device as claimed in claim 2, said removing device further comprising:

controlling means for controlling said selecting means so that said selecting means outputs said first phase information when said synchronizing word is detected and outputs said second phase information when said synchronizing word or said most probable phase is not detected.

4. The removing device as claimed as claim 1, wherein said counting means comprises:

first calculating means for calculating a first error number in a first phase representing a comparison of a first reference synchronizing word in said first phase with said received synchronizing word; and second calculating means for calculating a second error number in a second phase representing a comparison of a second reference synchronizing word in said second phase with said received synchronizing word.

5. The removing device as claimed as claim 4, wherein said second phase information controlling means comprises:

first comparing means for comparing said first error number with said second error number;

second comparing means for comparing said first error number with an error number corresponding to an inversion of said second phase; and logic means for determining which phase of four phases is the most probable, from results of the two comparisons in said first and second comparing means.

6. A method for controlling a phase ambiguity, the method comprising the steps of:

(a) counting a number of error bits of synchronizing words of two predetermined phases among four phases due to a received QPSK signal;

(b) generating a first phase information indicative of phases for which the received synchronizing word is detected on the basis of said number of error bits detected by said counting means;

(c) generating a second phase information indicative of phases in which a probability of existence of said synchronizing word is high when the received synchronizing words cannot be detected on the basis of said number of error bits detected by said counting means;

(d) selecting a phase information from said first phase information controller when the received synchronizing words are detected or from said second phase information controller when the received synchronizing words cannot be detected,.

(e) removing phase ambiguity from received signals on the basis of said first and said second phase informations.

* * * * *